(12) United States Patent
Fournier

(10) Patent No.: US 10,112,667 B2
(45) Date of Patent: Oct. 30, 2018

(54) BICYCLE STORAGE DEVICE

(71) Applicant: Louis Fournier, Saguenay (CA)

(72) Inventor: Louis Fournier, Saguenay (CA)

( * ) Notice: Subject to any disclaimer, the term of this patent is extended or adjusted under 35 U.S.C. 154(b) by 0 days.

(21) Appl. No.: 14/545,435

(22) Filed: May 4, 2015

(65) Prior Publication Data

US 2015/0314820 A1     Nov. 5, 2015

(30) Foreign Application Priority Data

May 5, 2014    (CA) .................................. 2851093

(51) Int. Cl.

| | |
|---|---|
| *B62H 3/00* | (2006.01) |
| *E05B 71/00* | (2006.01) |
| *E05B 65/00* | (2006.01) |
| *E05B 73/00* | (2006.01) |
| *B62H 5/00* | (2006.01) |

(52) U.S. Cl.
CPC .............. *B62H 3/00* (2013.01); *B62H 5/003* (2013.01); *E05B 65/00* (2013.01); *E05B 71/00* (2013.01); *E05B 73/0011* (2013.01); *B62H 2003/005* (2013.01); *E05B 73/0005* (2013.01); *Y10T 70/5027* (2015.04)

(58) Field of Classification Search
CPC .......... B62H 5/003; B62H 5/005; B62H 3/00; B62H 2003/005; B62H 3/12; B62H 3/04; B62H 3/08; E05B 73/0005; E05B 73/0011; E05B 71/00; E05B 65/00; Y10T 70/5027; Y10T 70/5872; Y10T 70/5876; Y10T 70/5881

USPC ............ 70/233–235, 62, 18, 30, 49, 54–56, 70/58–61, 63, 159–162, 225–227, 236, 70/DIG. 43, DIG. 56; 211/5, 17–24, 85.7; 224/924

See application file for complete search history.

(56) References Cited

U.S. PATENT DOCUMENTS

| | | | | |
|---|---|---|---|---|
| 1,008,271 | A * | 11/1911 | Jay ...................... | E05B 65/0003 211/4 |
| 2,180,117 | A * | 11/1939 | Lipsis ................... | B62H 5/003 109/51 |
| 3,781,861 | A * | 12/1973 | Adler et al. .................. | 340/571 |
| 3,827,773 | A * | 8/1974 | Aiello ........................... | 312/100 |
| 3,934,436 | A * | 1/1976 | Candlin et al. ................. | 70/234 |
| 3,989,327 | A * | 11/1976 | Candelaria ..................... | 312/100 |
| 4,012,930 | A * | 3/1977 | Benson ........................... | 70/234 |
| 4,069,919 | A * | 1/1978 | Fernbaugh ............ | E05B 69/006 211/4 |
| 4,079,872 | A * | 3/1978 | Halter ........................... | 224/418 |
| 4,474,116 | A * | 10/1984 | Castenada, Jr. ......... | A45C 13/20 109/50 |
| 4,681,380 | A * | 7/1987 | Carlin ................... | A47B 81/002 312/242 |
| 4,807,453 | A * | 2/1989 | Bernier et al. ................ | 70/233 |

(Continued)

FOREIGN PATENT DOCUMENTS

| | | | |
|---|---|---|---|
| DE | 102012110913 A1 | * | 5/2014 |
| EP | 0034554 | * | 8/1981 |
| FR | 2529606 | * | 1/1984 |

*Primary Examiner* — Lloyd A Gall
(74) *Attorney, Agent, or Firm* — William H. Bollman

(57) ABSTRACT

A bicycle stand including a frame, a flexible cable or chain for securing a bicycle to the frame, and a lockable container which is attached to the frame, the flexible cable or chain having both ends secured by a lock that is entirely within the container.

7 Claims, 4 Drawing Sheets

(56) References Cited

U.S. PATENT DOCUMENTS

| | | | | |
|---|---|---|---|---|
| 4,811,577 | A * | 3/1989 | Webster | E05B 67/003 70/14 |
| 4,813,253 | A * | 3/1989 | Dumas | E05C 5/00 70/137 |
| 4,920,334 | A * | 4/1990 | DeVolpi | 340/568.4 |
| 5,325,686 | A * | 7/1994 | Bentley | A47B 81/005 211/4 |
| 5,531,083 | A * | 7/1996 | Franck et al. | 70/58 |
| 5,595,073 | A * | 1/1997 | Sullivan | E05B 17/002 70/159 |
| 5,743,418 | A * | 4/1998 | Ahrens | 211/206 |
| 5,889,463 | A * | 3/1999 | Judd et al. | 340/427 |
| 5,917,407 | A * | 6/1999 | Squire et al. | 340/432 |
| 6,763,689 | B1 * | 7/2004 | Thomas | 70/14 |
| 7,431,555 | B2 * | 10/2008 | Liberman | A47G 29/141 414/787 |
| 7,571,628 | B2 * | 8/2009 | D'Anieri | 70/234 |
| 8,065,895 | B2 * | 11/2011 | Andersen | 70/14 |
| 8,439,210 | B1 * | 5/2013 | Griffith | A47G 25/10 211/106.01 |
| 8,500,074 | B1 * | 8/2013 | Cochran | B62H 3/12 211/17 |
| 8,636,153 | B1 * | 1/2014 | Dattilo | F41J 3/0028 211/85.7 |
| 8,770,453 | B2 * | 7/2014 | Lang | 224/315 |
| 2006/0266721 | A1 * | 11/2006 | Gregory | A47F 7/12 211/85.3 |
| 2009/0031766 | A1 * | 2/2009 | Stobbe | 70/263 |
| 2009/0201127 | A1 * | 8/2009 | Stobbe et al. | 340/5.6 |
| 2013/0228535 | A1 * | 9/2013 | Wood et al. | 211/5 |

* cited by examiner

BICYCLE STORAGE DEVICE

FIELD OF THE INVENTION

The present invention relates to bicycles and more particularly, relates to temporary bicycle storage and parking for cyclists.

BACKGROUND OF THE INVENTION

Bicycling has increased in popularity over the last several years and the use of a bicycle as a mode of transportation is increasing. Also increasingly popular is the use of the bicycle for recreational purposes.

The problem of bicycle storage is one which has existed for many years. Since bicycles are readily portable, bicycle theft has always been a problem and particularly with some of the more expensive bicycles which are increasingly common. In order to overcome this, the typical cyclist will carry a cable and a lock which will assist in securing the bicycle to an immovable object. The immovable object is typically a post of one sort or another such as a parking meter post. However, any suitable device around which a cable can be entwined can be used.

The locating of a suitable immovable object can sometimes be problematic. Accordingly, the provision of public bicycle racks is evolving. These bicycle racks can be used wherever cyclists will tend to temporarily leave their bicycle such as near restaurants, convenience stores, shopping malls, schools of various types, parks, near public transportation, etc.

One further problem which arises is that the cyclist usually has personal equipment which is ideally stored rather than carried by the cyclist. The personal equipment can include such things like a helmet, backpack, books, etc.

SUMMARY OF THE INVENTION

According to the present invention, there is provided a bicycle stand comprising a frame, a flexible cable for securing a bicycle to the frame, and a lockable container, the lockable container being attached to the frame, the flexible cable having at least one end thereof secured within the container.

According to the present invention, there is also provided a stand or support to which a bicycle may be secured and which will include a closed cabinet or container into which the cyclist's personal belongings may be placed. The container will be associated with a locking arrangement which will secure both the bicycle and the belongings of the cyclist.

The stand or support to receive the bicycle may come in many different forms and sizes. Thus, it could range from a single unit to units capable of receiving two or four bicycles or even further, they may be formed to receive a multiplicity of bicycles, either in a row or in a circular pattern. It suffices to say that any number of storage spaces may be provided with the storage spaces being of a size to accommodate all bicycle types—i.e. from children to adults, commuter bicycles, competitors' bicycles, etc.

As above mentioned, the storage unit will include a container into which the cyclist's belongings may be placed. There will also be provided a cable or chain which will extend exteriorly thereof and which may be wrapped around the various components of the bicycle as is presently known in the art.

The cable will be flexible and of a material/size sufficient to withstand normal cutting tools used by bicycle thieves. Preferably both ends of the cable will lock interiorly of the storage cabinet so that access will be denied thereto.

The cabinet or container will be locked. This can either be accomplished utilizing the lock of the user (well known in the art) or any other equivalent arrangement. Thus, there may be the capability for the user to rent a lock on site or alternatively, a locking mechanism may be utilized using a person's credit card or other identifying element such as numerical ID, etc. Thus, if used by a company for its employees, the identifying element or card may be issued by the company to its employees. The identifying element would be personal to the one person.

Naturally, the storage unit can include accessory equipment such as an alarm system. The units are preferably sufficiently rugged and weather resistant.

Each unit would be of a size/weight sufficient to prevent theft of the unit per se.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
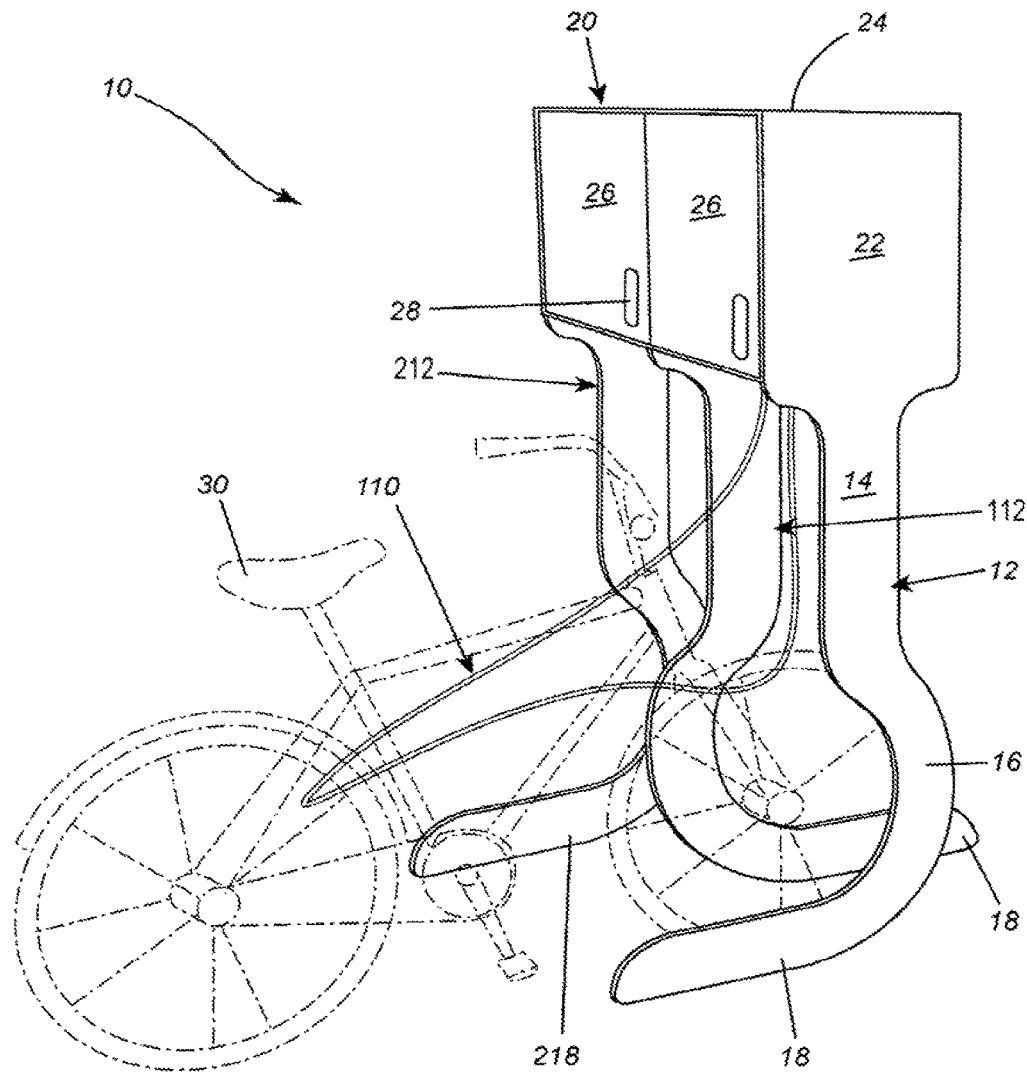
FIG. 1 is a perspective view of a first arrangement of a bicycle stand.

Referring to the drawings in greater detail and by reference characters thereto, there is illustrated in FIG. 1 a bicycle storage device generally designated by reference numeral 10 and which may be used to securely store one or more bicycles.

Bicycle storage device 10 includes a plurality of frame members 12, 112, 212 which are each similar and thus only one will be described herein.

Frame member 12 includes a vertical upper portion 14 and a horizontal lower portion 18. Horizontal lower portion 18 and vertical upper portion 14 are connected by an arcuate shaped middle portion or segment 16.

The bicycle storage device 10 includes a storage container which is generally designated by reference numeral 20. Storage container 20 is defined by a plurality of walls as is conventional in the art; shown herein are side wall 22 and top wall 24. A door 26 provides access to the interior of storage container 20 and a handle 28 may be provided. The storage container 20 will also include a locking arrangement which is not illustrated in this embodiment. It suffices to say that any number of known locking devices and/or locks may be utilized in the practice of the invention.

Bicycle storage 10 is designed to receive one or more bicycles with a single one 30 being illustrated in dotted lines herein. A locking cable 110 is utilized to lock about one or more portions of bicycle 30 and is locked interiorly of storage container 20 as will be illustrated hereinbelow.

Figure 2:
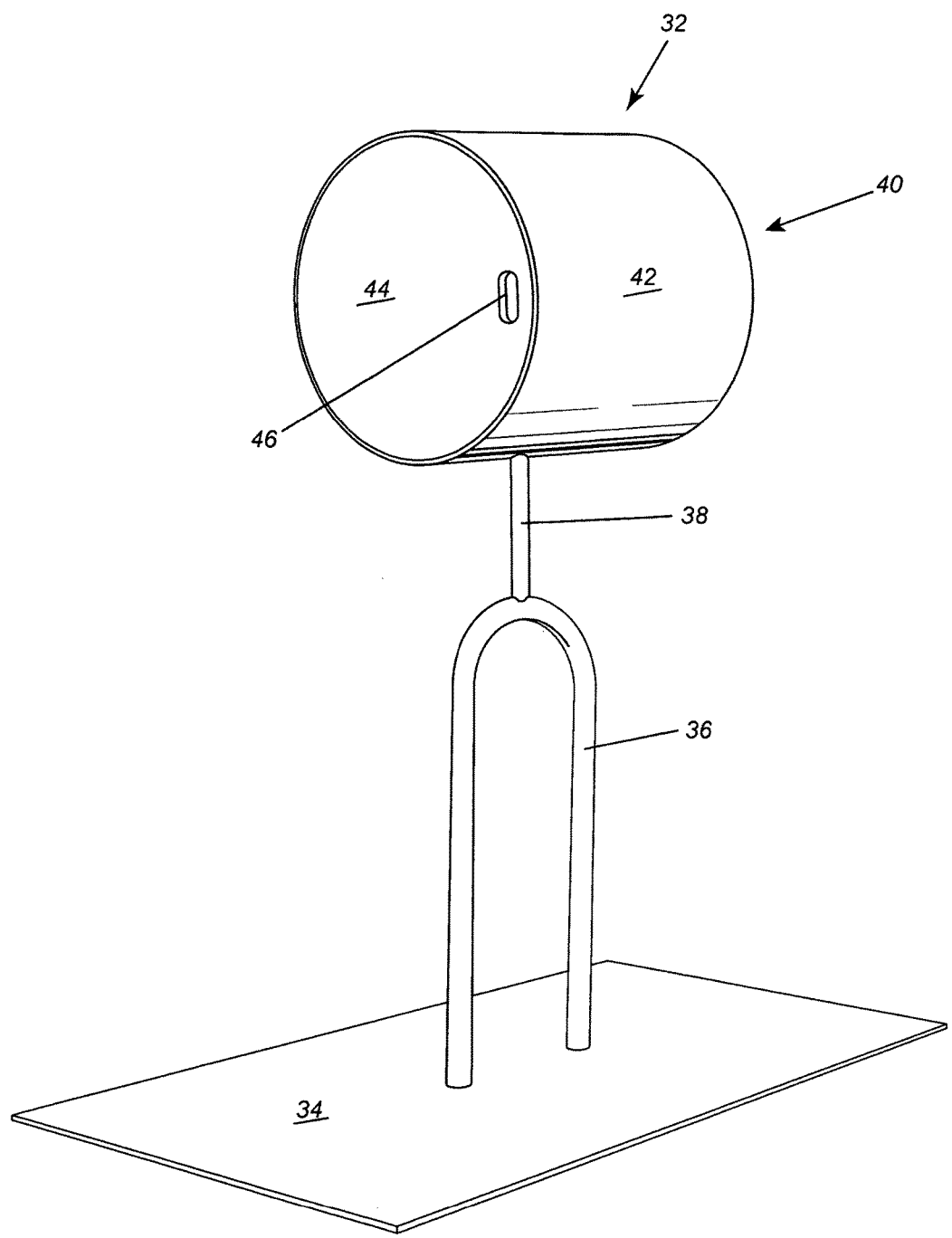
FIG. 2 is a perspective view of another embodiment thereof.

A further embodiment of the invention is illustrated in FIG. 2. A bicycle storage device is generally designated by reference numeral 32. Bicycle storage device 32 includes a platform or base 34. Sitting on base 34 is an inverted U-shaped frame generally designated by reference numeral 36. Connected to and extending upwardly from inverted U-shaped frame 36 is a vertical post 38. Vertical post 38 is used to mount a storage container generally designated by reference numeral 40 and which includes a cylindrical side wall 42. A door 44 with a handle 46 is provided at one end thereof. As was the case in the previous embodiment, a suitable locking arrangement is provided between door 44 and cylindrical wall 42.

Figure 3:
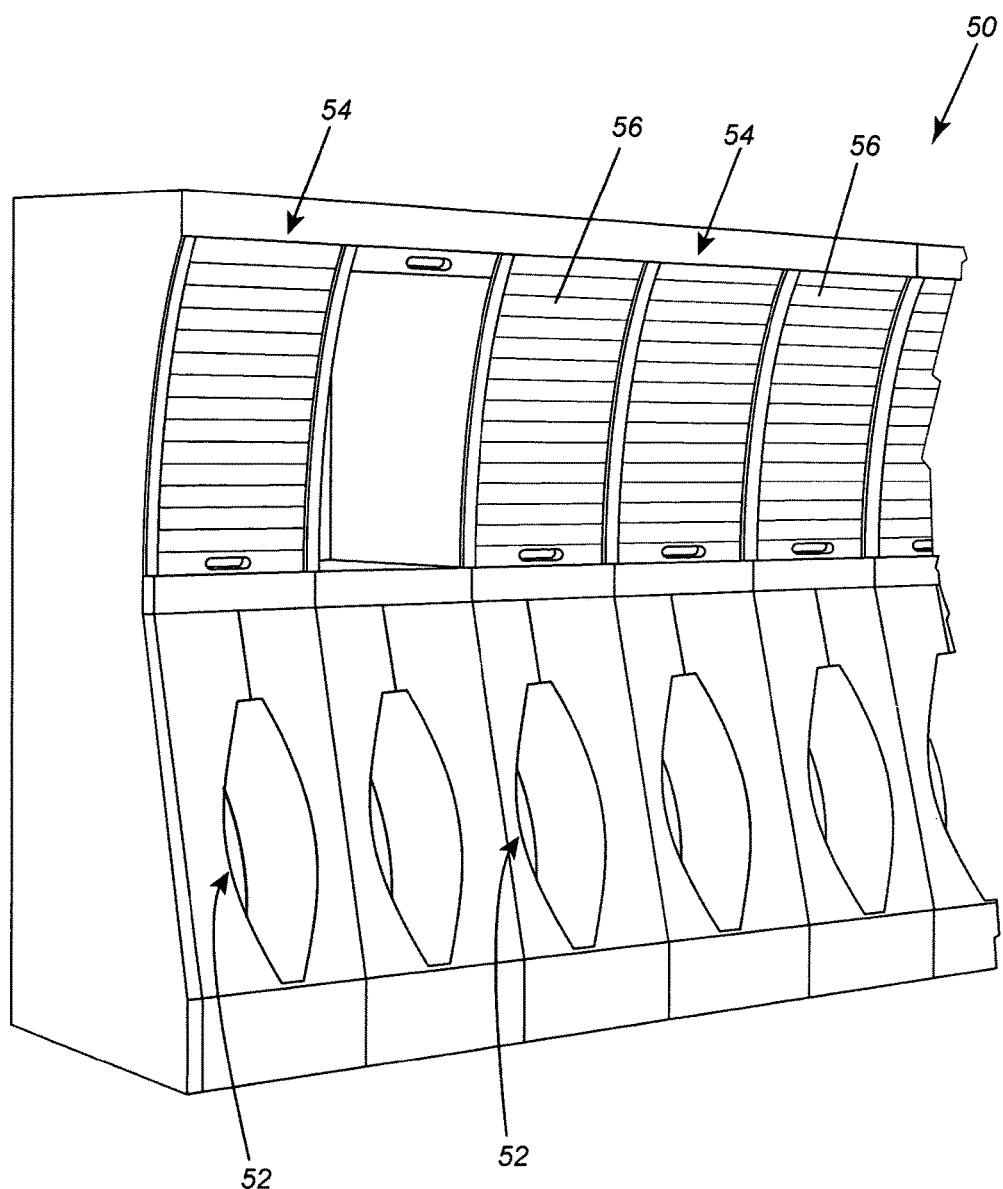
FIG. 3 is a perspective view of a still further embodiment thereof.

In the embodiment of FIG. 3, there is provided a bicycle storage device generally designated by reference numeral 50. Bicycle storage device 50 includes a number of individual storage slots 52 defined within a frame and housing. Each individual storage slot 52 has a storage container 54 associated therewith. Each storage container 54 includes a sliding door 56 along with a suitable locking arrangement.

Figure 5:
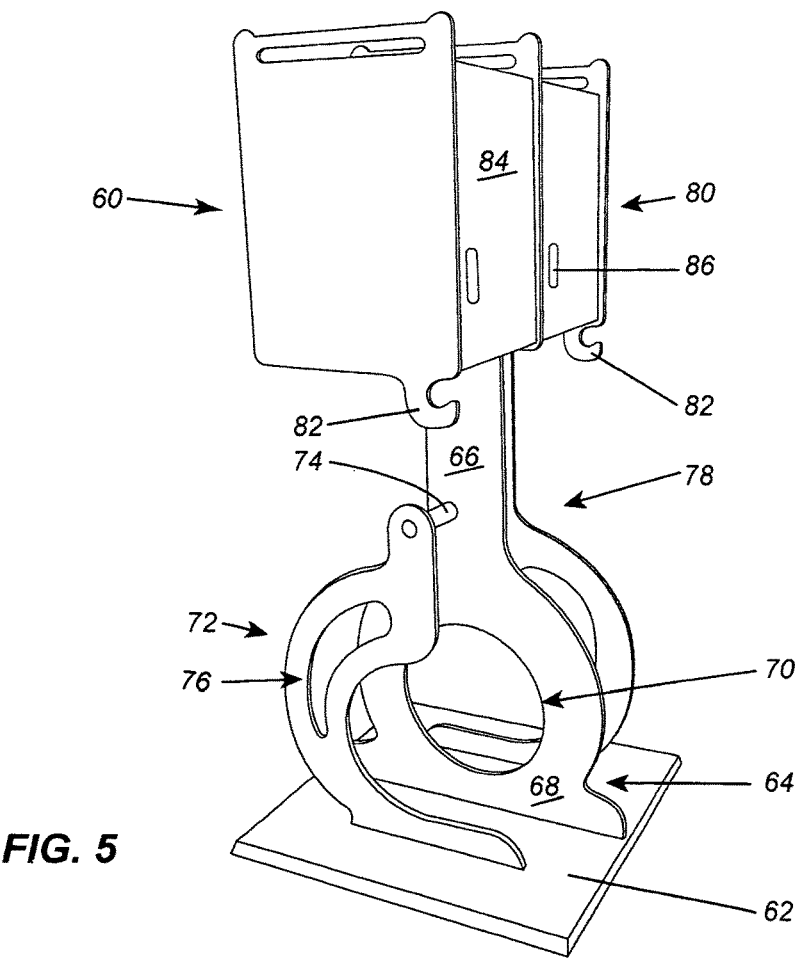
FIG. 5 is a perspective view of a further embodiment.

A further bicycle storage device is illustrated in FIG. 5 and reference will now be had thereto. A bicycle storage device is generally designated by reference numeral 60. Bicycle storage device 60 includes a platform or base 62 which is designed to sit on a substrate surface. In this embodiment, bicycle storage device 60 includes a center frame member generally designated by reference numeral 64. Center frame member 64 has an upper portion 66 and a lower portion 68. As may be seen, lower portion 68 includes a circular cut-out 70 to permit the passing of a cable therethrough.

A first side frame member generally designated by reference numeral 72 has an attachment rod 74 which is connected to center frame member 64. Side frame member 72 also has a cutout 76.

A second side frame member 78 is provided on the other side of center frame member 64 and is substantially identical to side frame member 72 save and except that it is reversed in position. Storage compartments 80 are provided and are mounted to the upper portion 66 of center frame member 64. It will be noted that extending downwardly from storage compartments 80 are hooks 82 which may be utilized to receive accessories. Doors 84 have handles 86 associated therewith. As is the case in the previously described embodiments, a suitable locking arrangement is provided for doors 84.

Figure 4:
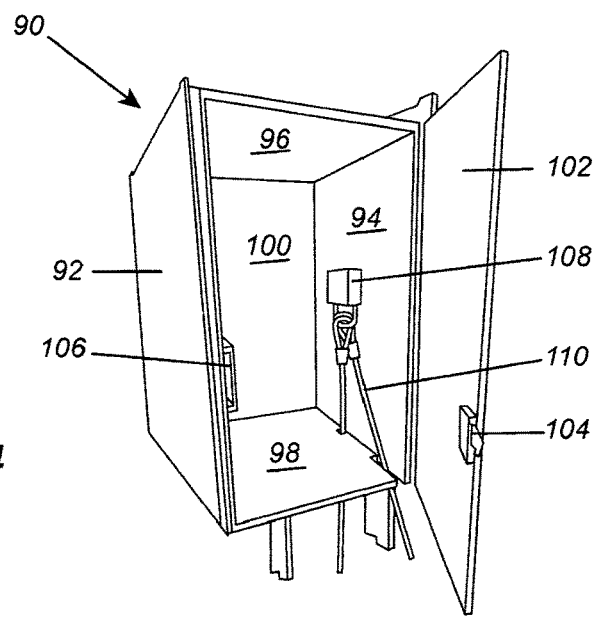
FIG. 4 is a view illustrating the locking of the device within a storage cabinet.

A typical storage compartment is illustrated in FIG. 4 and is designated by reference numeral 90. Storage compartment 90 includes first and second side walls 92, 94, a top wall 96, a bottom wall 98, and a back wall 100. A door 102 is provided to gain access to storage compartment 90. Door 102 has a locking mechanism 104 thereon which will engage with a mating locking mechanism 106 on side wall 92.

An interior lock 108 is provided to which a flexible cable 110 may be connected. Cable 110 may extend outwardly through openings between side wall 94 and bottom wall 98.

It will be understood that the above described embodiment is for purposes of illustration only and that changes and modifications may be made thereto without departing from the spirit and scope of the invention.

I claim:

1. A bicycle stand, comprising:
   a frame defining a plurality of bike receiving recesses;
   a plurality of lockable containers, the number of lockable containers being equal to the number of bike receiving recesses, each of said plurality of lockable containers being located above a respective one of the plurality of bike receiving recesses, each of the plurality of lockable containers having an access door and being sized to receive at least a bicycle helmet;
   an externally lockable latch on the access door of each of the plurality of lockable containers, the lockable latch securing the access door in a closed secured state to create a secured interior of a respective one of the plurality of lockable containers; and
   a plurality of flexible cables each associated respectively with one of the plurality of lockable containers, the plurality of lockable containers each including a plurality of passageways in a bottom wall, both ends of each said flexible cable breaching into the secured interior of the lockable container through the plurality of passageways in the bottom wall with the access door in the closed secured state while a central portion of the flexible cable is external to the respective one of the plurality of lockable containers;
   wherein an interior lock securing the at least one end of the flexible cable is held entirely within the secured interior of the respective one of the plurality of lockable containers with the access door in the closed secured state; and
   wherein at least one of the plurality of passageways in the bottom wall is formed between a side wall and the bottom wall of the respective one of the plurality of lockable containers.

2. The bicycle stand according to claim 1 wherein:
   each of said plurality of lockable containers utilizes a key lock.

3. The bicycle stand according to claim 2 wherein:
   each of said plurality of flexible cables associated respectively with one of said plurality of lockable containers is substantially cut resistant.

4. The bicycle stand according to claim 1, further comprising:
   a hook member formed on an exterior of each of said plurality of lockable containers.

5. The bicycle stand according to claim 1, wherein said interior lock comprises:
   a padlock.

6. The bicycle stand according to claim 1, wherein the interior lock comprises:
   a keyed lock.

7. The bicycle stand according to claim 1, wherein the at least one of the plurality of passageways in the bottom wall is formed between a right side wall and the bottom wall of the respective one of the plurality of lockable containers.

* * * * *